United States Patent [19]
Ozaki et al.

[11] Patent Number: 5,460,754
[45] Date of Patent: Oct. 24, 1995

[54] NON-LINEAR OPTICAL MATERIAL, METHOD OF MANUFACTURING THE SAME AND OPTICAL WAVELENGTH CONVERTER

[75] Inventors: Yusuke Ozaki, Toyonaka; Hisashi Minemoto, Kyoto; Nobuo Sonoda, Settsu; Tetsuji Kawakami, Katano; Tatsurou Kawamura, Takatsuki; Katsuya Wakita, Nara, all of Japan

[73] Assignee: Matsushita Electric Industrial Co., Ltd., Japan

[21] Appl. No.: 254,173

[22] Filed: Jun. 6, 1994

Related U.S. Application Data

[62] Division of Ser. No. 829,737, Jan. 31, 1992, Pat. No. 5,346,653.

[30] Foreign Application Priority Data

Feb. 18, 1991 [JP] Japan ................................. 3-046058
Aug. 26, 1991 [JP] Japan ................................. 3-213550

[51] Int. Cl.$^6$ ...................................................... F21V 9/00
[52] U.S. Cl. ........................................... 252/582; 252/587
[58] Field of Search ................................. 252/582, 587; 359/328

[56] References Cited

U.S. PATENT DOCUMENTS

| | | | |
|---|---|---|---|
| 4,166,180 | 8/1979 | Kato et al. | 544/398 |
| 4,370,329 | 1/1983 | Scherm et al. | 544/394 |
| 5,080,832 | 1/1992 | Etter et al. | 252/582 |
| 5,196,147 | 3/1993 | Taketani et al. | 252/582 |
| 5,306,826 | 4/1994 | Boesten | 564/425 |
| 5,346,653 | 9/1994 | Ozaki et al. | 252/582 |
| 5,352,388 | 10/1994 | Seddon et al. | 252/582 |

FOREIGN PATENT DOCUMENTS

WO9116657  3/1991  WIPO.

OTHER PUBLICATIONS

Abstract—World Patents Index Week 9101, Derwent Publications—AN91-004394 & JP-A-2282231—Ajinomoto 19 Nov. 1990.
Abstract—World Patents Index Week 9016, Derwent Publications, AN90-1211754 JP-A-2073236—Teijin—13 Mar. 1990.
Velsko et al, "New organic materials for efficient harmonic generation of near ultraviolet light", *SPIE Nonlinear Properties of Materials*, vol. 971, 1988, pp. 113–117.
Okada et al, "Synthesis and Crystal Structure of a Novel Organic Ion–Complex for Second–Order Nonlinear Optics" Japanese Journal of Applied Physics, vol. 29, No. 6, Jun. 1990, pp. 1112–1115.

(List continued on next page.)

*Primary Examiner*—Philip Tucker
*Attorney, Agent, or Firm*—Ratner & Prestia

[57] ABSTRACT

The invention relates to a non-linear optical material comprising a salt of an organic compound with an optically active organic acid, wherein said organic compound has a conjugated $\pi$ electron system containing both electron donor and acceptor groups and has at least one substituent group represented by the following formulas (1), (2) and (3) which is located outside of said conjugated $\pi$ electron system. The invention also concerns a method of manufacturing the optical material and an optical converter which uses the non-linear optical material.

$$-NH_2 \qquad (1)$$

$$-NH- \qquad (2)$$

$$\underset{|}{-N-} \qquad (3)$$

According to the invention, a second-order non-linear optical material, which is readily capable of crystal growth, permits a large crystal to be readily obtained, and ensures high hardness of the crystal and gives excellent processibility and non-linear optical characteristics.

4 Claims, 5 Drawing Sheets

OTHER PUBLICATIONS

Chemical Abstracts 115:183239v, "Compounds with potential second order non-linear optical activity", Rao, 1991.

Takamoto Sasaki et al., Preprints of International Workshop on Crystal Growth of Organic Materials, pp. 245–255, 1989.

G. R. Meredith, "Nonlinear Optical Properties of Organic and Polymeric Materials", ACS Symposium Series 233, pp. 27–56, 1983.

FIG. I 5,460,754

NON-LINEAR OPTICAL MATERIAL, METHOD OF MANUFACTURING THE SAME AND OPTICAL WAVELENGTH CONVERTER

This application is a division of application Ser. No. 07/829,737, filed Jan. 31, 1992, now U.S. Pat. No. 5,346,653.

BACKGROUND OF THE INVENTION

1. Field of the Invention

The present invention relates to non-linear optical materials having second-order non-linear optical characteristics, a method of manufacturing the same and optical wavelength converters using the same.

2. Description of the Prior Art

Heretofore, $KH_2PO_4$ (abbreviated as KDP), $LiNbO_3$ (abbreviated as LN) and like materials have been used for laser beam wavelength converters and electro-optic modulators using Pockels effect. Recently, organic compounds having large optical nonlinearity as the crystals have been found, and study and development concerning them are being made. In order for a crystallized organic compound to have second-order non-linear optical characteristics, it is necessary that the molecular second-order polarizability β of the compound is relatively large and that the crystal structure is not centrosymmetric. For destroying the centrosymmetric structure, the following means can be used: (1) Like the case of 2-methyl-4-nitroaniline (abbreviated MNA), substituent group (i.e., a methyl group in this case) are introduced to decrease the symmetry of the molecules.

(2) Like the case of methyl-(2,4-dinitrophenyl)aminopropanate, N-(5-nitro-2-pyridyl)-(S)-prolinol or like compound, an asymmetric carbon atoms is introduced to a molecule to decrease the symmetry of the molecules.

(3) To form an organic salt such as a trans-4'-dimethylamino-N-methyl- 4-stilbazolium methylsulfate.

Well-known organic compounds having second-order non-linear optical characteristics and available as large crystals, are organic salts of L-arginine phosphate monohydrate (abbreviated as LAP) and so forth.

Crystal organic compounds having second order non-linear optical characteristics previously included those compounds which form molecular crystals. These compounds have molecules which are bonded together in the crystal by van der Waals bonds or hydrogen bonds. As the binding force is weak, and as the molecular symmetry is low, it is difficult to obtain a large crystal of this type of compound. Even if a large crystal can be obtained, subsequent mechanical processing (such as cutting or polishing to obtain an optical surface) is difficult or impossible because of low mechanical strength. Thus, it is impossible to obtain a surface having satisfactory optical characteristics. Problems are, therefore, presented when the crystal is processed into a device or element.

In ionic crystal organic compounds, such as salts, strong ionic bonds are formed in the crystal compared to van der Waals bonds or hydrogen bonds. Single crystals which are relatively large and have high mechanical strength, are obtainable. However, with the well-known ionic crystal organic compounds having second order non-linear optical characteristics, e.g., a trans-4'-dimethylamino-N-methyl-4-stilbazolium methylsulfate, the length of the conjugated π electron system is very large. That is, the optical absorption maximum wavelength is comparable to that of the second harmonic of Nd:YAG or semiconductor laser beams. Therefore, wavelength converted light is absorbed by the material, and the second harmonic can not be efficiently obtained. The LAP has small optical nonlinearity and particularly low efficiency of low power laser beam conversion. Therefore, it can not be used for the wavelength conversion of semiconductors or like laser beams.

SUMMARY OF THE INVENTION

It is an object of the invention to provide a non-linear optical material, which is readily capable of crystal growth, can be readily grown to a large crystal, and ensures high hardness of its crystall and has excellent processing and non-linear optical characteristics as the crystal. Another objects are to provide a method of manufacturing the optical materials and to provide optical wavelength converters using the optical materials, thus solving the above problems inherent in the prior art.

It is a further object of the invention to provide a second-order non-linear optical material which is readily capable of crystal growth, ensures high hardness of crystal and has excellent processing and non-linear optical characteristics as the crystal.

It is a further object of the invention to provide a second-order non-linear optical material which does not absorb the second harmonic of a Nd:YAG laser beam and thus has improved wavelength conversion characteristics.

It is a still further object of the invention to provide a method of manufacturing a second-order non-linear optical material which is readily capable of crystal growth, permits a large crystal to be readily obtained, ensures high hardness of its crystal and has excellent processing and non-linear optical characteristics as the crystal.

It is a yet further object of the invention to provide an optical wavelength converter which uses one of the above non-linear optical materials as an optical wavelength conversion crystal and has excellent optical wavelength conversion characteristics.

The present invention relates to a non-linear optical material comprising a salt of an organic compound with an optically active organic acid, wherein said organic compound has a conjugated π electron system containing both electron donor and acceptor groups and has at least one of substituent group represented by the following formulas (1), (2) and (3) which is located outside of said conjugated π electron system.

  (1)

  (2)

  (3)

The invention relates to non-linear optical materials in which the organic compound has a conjugated π electron system containing both electron donor and acceptor groups and has at least one of substituent group represented by the formulas (1), (2) and (3) which is located outside of said conjugated π electron system. Preferably, the compound is 1-(4-nitrophenyl)piperazine or 2-(2-aminoethylamino)-5-nitropyridine or 2-(diethylamino)ethyl 4-aminobenzoate.

The invention further relates to a method of manufacturing a non-linear optical material, comprising producing a single crystal of a salt of an organic compound with an optically active organic acid from a solution of a solvent containing a mixture of water and an organic solvent by temperature reduction or solvent evaporation, wherein said organic compound has a conjugated π electron system containing both electron donor and acceptor groups and has at least one of substituent group represented by the above mentioned formulas (1), (2) and (3) which is located outside of said conjugated π electron system.

The invention further relates to an optical wavelength converter in which a wavelength conversion crystal of a non-linear optical material according to the invention is inserted into the optical cavity.

DESCRIPTION OF THE PREFERRED EMBODIMENT

Figure 1:
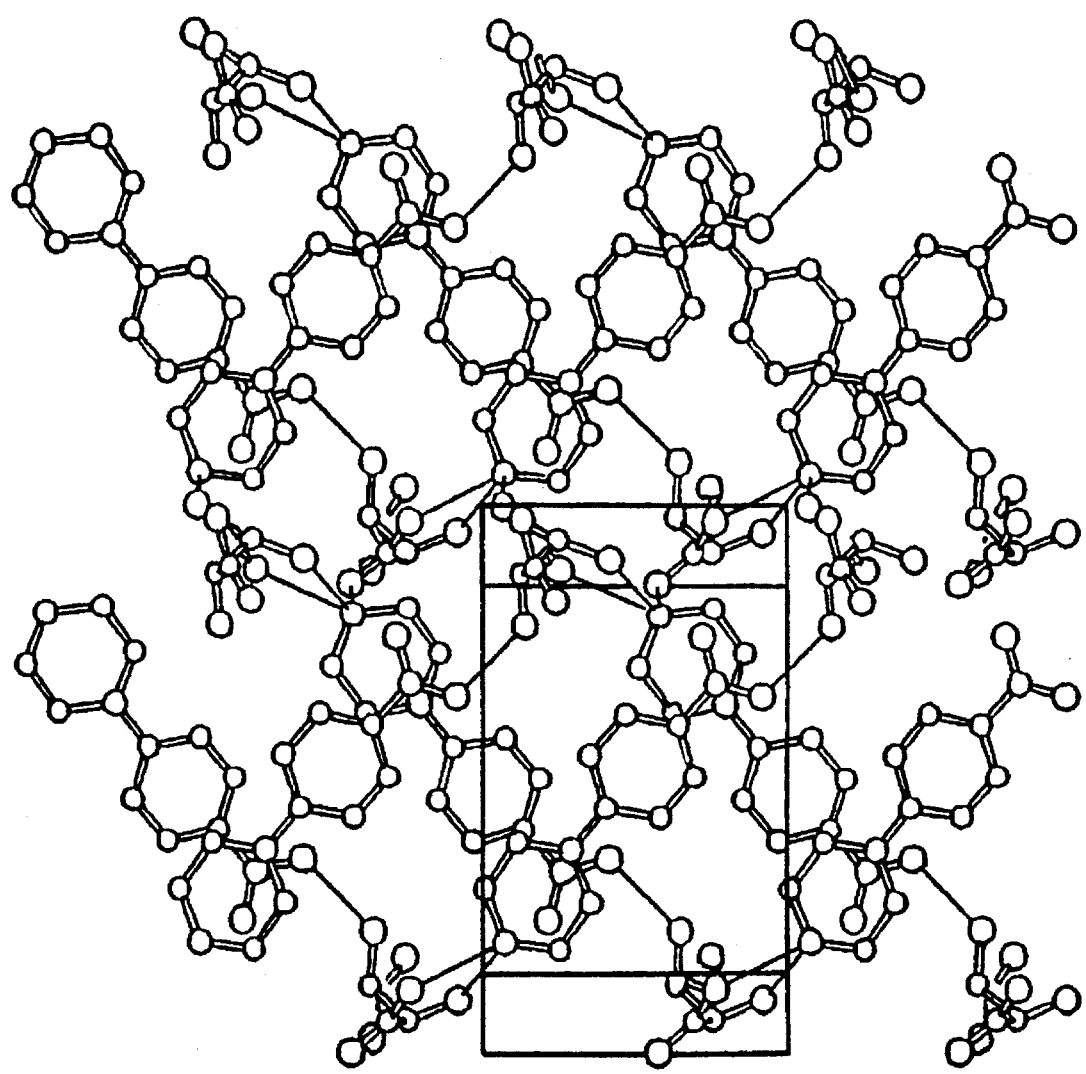
FIG. 1 is a view showing the crystal structure of a non-linear optical material, i.e., 1-(4-nitrophenyl)piperazine in the form of a salt of L-tartaric acid, taken in a certain dielectric principal axis. The material is described in Example 1.

The non-linear optical material according to the invention comprises a salt of an organic compound with an optically active organic acid, wherein said organic compound has a conjugated π electron system containing both electron donor and acceptor groups and has at least one of substituent group represented by the following formulas (1), (2) and (3) which is located outside of said conjugated π electron system.

This means that the conjugated π electron system containing both electron donor and acceptor groups is retained in the non-linear optical material according to the invention. Thus, the value of the molecular second-order polarizability β that is required for a second-order non-linear optical material, can be realized with the non-linear optical material according to the invention.

In many cases, it is difficult to cause the substituent groups of the formulas (1) to (3) contained in the conjugated π electron system noted above to accept protons because it changes the stable conjugated π electron system. Even when protons are accepted, the electronic state of the conjugated π electron system is usually greatly altered. In many cases, this is undesirable. For example, it reduces β which depend on the electronic state of the conjugated π electron system or generates a light absorption peak in the visible region. According to the invention, the above problem can be avoided because the substituent group which concern the conversion to a salt of the organic compound having the conjugated π electron system containing both electron donor and acceptor groups are at feast one of the substituent groups represented by the formulas (1), (2) and (3) which are located outside of said conjugated π electron system.

The noncentrosymmetry of crystal structure which is necessary to provide the crystal with second-order non-linear optical characteristics is introduced into the crystal of the non-linear optical material according to the invention by using an optically active organic acid for producing a salt from the organic compound. Usually, an organic compound producing a molecular crystal is imparted with the optical activity in a very complicated way. According to the non-linear optical material of the invention, a crystal can be produced very readily because the process is based on a typical neutralizing reaction. Moreover, the optically active organic acid is naturally abundant.

The non-linear optical material according to the invention is in the form of a salt having ionic bonds, which are far stronger than van der Waals bonds or hydrogen bonds. Thus, a larger crystal than the molecular crystals formed by van der Walls bonds or hydrogen bonds can be readily produced without generation of crystal defects. In addition, because of the very strong binding force, it is possible to obtain a crystal which has high hardness and can withstand mechanical processing such as cutting or polishing to obtain optical surface.

Thus, according to the invention a non-linear optical material can be readily obtained which has excellent non-linear optical characteristics, the crystal of which is free from centrosymmetric structure, and which is readily capable of crystal growth and ensures high hardness and good processibility of its crystal.

In the non-linear optical material according to the invention, the organic compound which is comprises the conjugated π electron system containing both electron donor and acceptor groups and at least one of the substituent groups of the formulas (1) to (3) noted above which is located outside of said conjugated π electron system, is preferably 1-(4-nitrophenyl)piperazine or 2-(2-aminoethylamino)-5-nitropyridine. These organic compounds do not absorb the second harmonic of a Nd:YAG laser beam. Therefore, it is possible that non-linear optical material does not absorb the second harmonic of the YAG laser beam, and thus more satisfactory wavelength conversion characteristics can be obtained.

In the non-linear optical material according to the invention, the organic compound having the conjugated π electron system containing both electron donor and acceptor groups and having at least one of substituent group represented by the formulas (1), (2) and (3) which is located outside of said conjugated π electron system, is preferably 1-(4-nitrophenyl)piperazine while the organic acid is preferably tartaric acid or phenylsuccinic acid. The organic compound also preferably is 2-(2-aminoethyl)-5-nitropyridine while the organic acid is selected from the group consisting of malic acid, mandelic acid, phenylsuccinic acid and leucinic acid. The organic compound also preferably is 2(diethylamino-)ethyl 4-aminobenzoate while the organic acid is preferably phenylsuccinic acid. The organic acids noted above are inexpensive and readily available. Thus, they permit the non-linear optical material to be readily obtained. These organic acids have comparatively low molecular weights. Therefore, the proportion of the conjugated π electron system containing both electron donor and acceptor groups in the crystal of the non-linear optical material is increased. It is thus possible to realize the more excellent non-linear optical characteristics in a second-order non-linear optical material. Since such a non-linear optical material does not absorb the second harmonic of a Nd:YAG laser beam, satisfactory wavelength conversion characteristics with respect to the Nd:YAG laser beam can be obtained. In particular, tartarate and phenylsuccinate, the acids of which have two carboxyl groups, permit greater numbers of ionic bonds to be formed in a single crystal. It is thus possible to achieve a non-lineaer optical material which is more readily capable of crystal growth and has increased hardness and excellent processibility of its crystal.

In a method of manufacturing the non-linear optical material according to the invention, a single crystal comprising the salt of an organic compound noted above containing the substituent group noted above with an optically active organic acid, is produced from a solution of a solvent comprising a mixture of water and an organic solvent by temperature reduction or solvent evaporation. The salt noted above is usually difficult to dissolve in water or an organic solvent, but it is readily dissolved in a mixtures of water and organic solvent. It is thus possible to obtain a large crystal of the non-linear optical material in the above method.

In the above method of manufacturing the non-linear optical material, it is preferable to use 1-(4-nitrophenyl)piperazine as the organic compound having a conjugated π electron system containing both electron donor and acceptor groups and having at least one of substituent group represented by the formulas (1), (2) and (3) which is located outside of said conjugated π electron system. it is also preferable to use tartaric acid or phenylsuccinic acid as the optically active organic acid and to use tetrahydrofuran as the organic solvent. The salt of optically active tartaric acid or phenylsuccinic acid with 1-(4-nitrophenyl)piperazine has a considerably high solubility with respect to an adequately mixed water/tetrahydrofuran solvent. Thus, a non-linear optical material obtained by the above method forms a larger crystal.

In the above method of manufacturing a non-linear optical material according to the invention, it is preferable to use 1-(4-nitrophenyl)piperazine as the organic compound having a conjugated π electron system containing both electron donor and acceptor groups and having at least one of substituent group represented by the formulas (1), (2) and (3) which is located outside of said conjugated π electron system. It is also preferable to use tartaric acid as the optically active organic acid and to use acetonitrile as the organic solvent. The salt of optically active tartaric acid or phenylsuccinic acid with 1-(4-nitrophenyl)piperazine has a considerably high solubility with respect to an adequately mixed water/tetrahydrofuran solvent. Thus, a non-linear optical material which is larger crystal can be obtained by the above method.

According to the invention, an optical wavelength converter having excellent wavelength conversion characteristics can be obtained by using the above non-linear optical materials of the invention as a wavelength conversion crystal which is inserted into the resonator.

Examples of the conjugated π electron system in the non-linear optical material according to the invention includ benzene derivatives, pyridine derivatives, pyrimidine derivatives, pyrazine derivatives, triazine derivatives, pyrane derivatives, pyrrole derivatives, pyrroline derivatives, pyrazole derivatives, imidazole derivatives, furan derivatives, thiophene derivatives, thiazole derivatives, naphthalene derivatives, quinoline derivatives, indole derivatives, benzimidazole derivatives, indazole derivatives, benzofuran derivatives, benzothiazole derivatives, vinyl derivatives, allyl derivatives, etc.

Examples of electron donor groups are amino groups, alkylamino groups, dialkylamino groups, arylamino groups, diarylamino groups, alkylarylamino groups, hydroxyl groups, alkoxy groups, etc.

Examples of electron acceptor groups are nitro groups, cyano groups, formyl groups, alkylcarbonyl groups, arylcarbonyl groups, carboxyl groups, etc.

The optical activity may be either levorotaroty or dextrorotatory. Examples of the optically active acid are phenylsuccinic acid, malic acid, mandelic acid, leucinic acid, lactic acid, tartaric acid, abietic acid, quinic acid, camphoric acid, camphor-10-sulfonic acid, methoxyphenylacetic acid, 2-methoxy-2-trifluoromethylphenylacetic acid, phenylpropionic acid, etc.

Among these organic acids, tartaric acid, phenylsuccinic acid, malic acid, mandelic acid and leucinic acid are preferably used because they are comparatively low in molecular weight as well as inexpensive and readily available.

As the organic solvent, tetrahydrofuran, 1,4-dioxane, acetonitrile etc. may be used. These solvents are capable of being mixed with water.

Examples of the invention will now be described.

EXAMPLE 1

To 650 ml of an aqueous solution containing 9.06 g of L-tartaric acid, 12.44 g of 1-(4-nitrophenyl)piperazine was added. The resulting solution was heated to 60° C. Then, insoluble material was filtered out, and the filtrate was cooled to obtain a precipitate. This precipitate was recovered and purified by repeated recrystallization in water. Sample 1-A was obtained.

Figure 2:
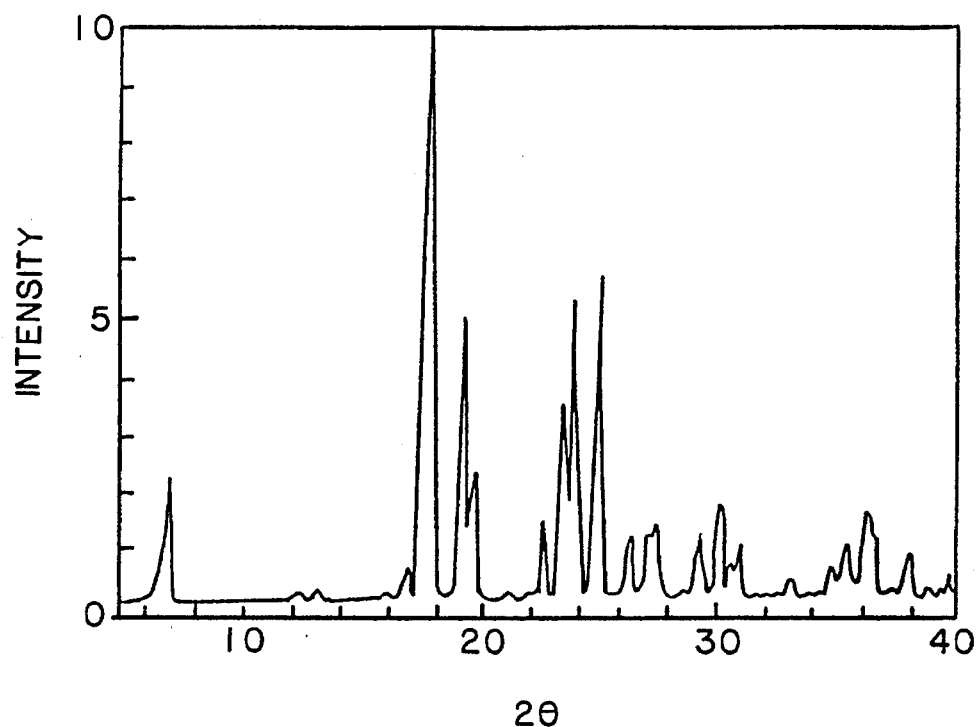
FIG. 2 is a chart showing X-ray diffraction pattern of a powder specimen of the non-linear optical material, i.e., 1-(4-nitrophenyl)piperazine in the form of a salt of L-tartaric acid, which is further described in Example 1.
Figure 3:
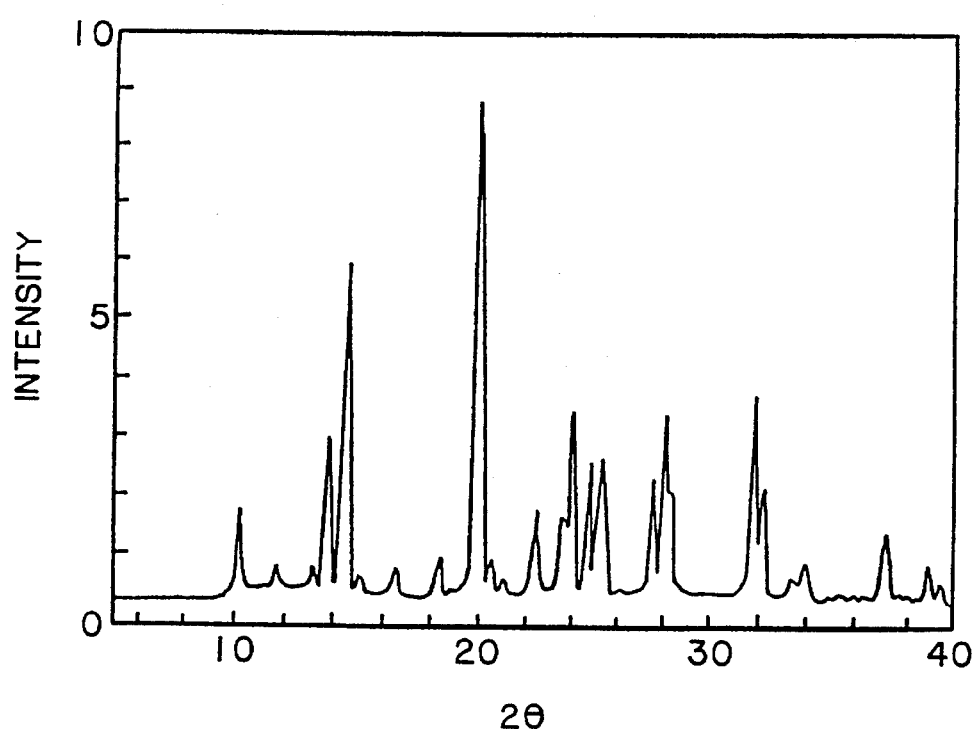
FIG. 3 is a chart showing X-ray diffraction pattern of a powder specimen of 1-(4-nitrophenyl)piperazine.
Figure 4:
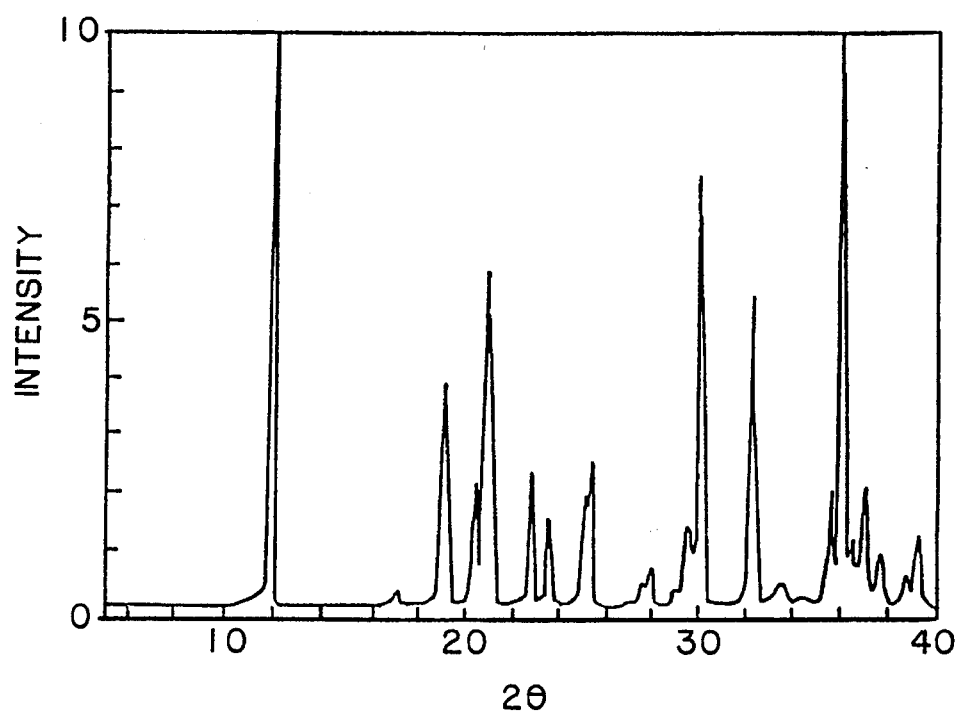
FIG. 4 is a chart showing X-ray diffraction pattern of a powder specimen of L-tartaric acid.

FIG. 2 shows an X-ray diffraction pattern using $CuK_\alpha$ radiation of a sample obtained by powdering Sample 1-A. This X-ray diffraction pattern is a different from that of the powder specimen of 1-(4-nitrophenyl)piperazine shown in FIG. 3 or that of the powder specimen of L-tartaric acid shown in FIG. 4. Thus, Sample 1-A is not a mere mixture of 1-(4-nitrophenyl)piperazine and L-tartaric acid.

The NMR spectrum of a DMSO-$d^6$ solution of the sample exhibited signals due to two kind of the methylene groups (having a proton number of 4, respectively) of the 1-(4-nitrophenyl)piperazine part at 3.48 and 3.77 ppm, respectively, a signal due to the C-H groups (having a proton number of 2) of the L-tartaric acid part at 4.53 ppm and signals due to two kind of the C-H groups (having a proton number of 2, respectively) of the benzene ring of 1-(4-nitrophenyl)piperazine part at 7.02 and 8.11 ppm, respectively. The ratio of the peak intensities of these signals were 2:2:1:1:1. Thus, Sample 1-A contains L-tartaric acid part and 1-(4-nitrophenyl)piperazine part in a molar ratio of 1:1.

Elemental analysis values were C: 47.2%, H: 5.4%, N: 11.7% and O: 35.7%. These values correspond well with the calculated values of C: 47.1%, H: 5.3%, N: 11.8% and O: 35.9%. The calculated values were made by assuming that L-tartaric acid and 1-(4-nitrophenyl)piperazine were contained in a molar ratio of 1:1.

Sample 1-A was dissolved in a mixed water/acetonitrile mixture (having a volume ratio of 1:1) to obtain about 20 cc of saturated solution. The solution was left at room temperature for about 7 days to slowly evaporate the solvent. A crystal sample (i.e., Sample 1-B) having a size of 2 mm×1 mm×0.1 mm was obtained.

It was found using powder X-ray analysis that this crystal had the same crystal structure as that of Sample 1-A. As a result of X-ray crystal structure analysis, Samples 1-A and 1-B were found to have a salt structure as shown by the chemical formula (4) given below and a crystal structure as shown in FIG. 1.

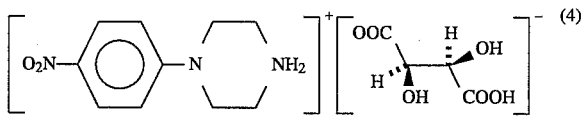

FIG. 1 is a view showing the crystal structure of the salt of 1-(4-nitrophenyl)piperazine with L-tartaric acid, taken in a certain electric principal axis (no hydrogen atom being shown). Enclosed in the rectangle in FIG. 1 is a unit cell.

In this crystal structure, the molecular dipole moment of p-nitroaniline (pNA) structure parts which is related to a large β value did not cancel each other but were directed as an average in the b axis direction.

The second harmonic generation (SHG) intensity of Sample 1-A and that of urea were measured by the Kurtz' powder method (S. K. Kurtz, J. App. Phys., 39, 3798 (1968)). A Nd:YAG laser (1,064 nm) was used as the light source. These crystal sample were pulverized using agate mortars to obtain a sample for SHG measurement. It was found that the efficiency of Sample 1-A was 10.1 times the urea value, demonstrating by the measurement a excellent non-linear optical characteristic.

The SHG intensity of the powder specimen 1-(4-nitrophenyl)piperazine was also measured and was found to be below the limit of measurement. It was thought that the pNA structure parts were aligned centrosymmetrically in the 1-(4-nitrophenyl)piperazine crystal.

The SHG intensity of the powder specimen of L-tartaric acid was also measured and found to be below the limit of measurement.

To determine the processibility of the crystal, the Vickers hardness of Sample 1-B was measured and found to be 63. The value was far greater (i.e., 3 to 6 times) than the SHG value of a typical prior art molecular crystal non-linear optical material (e.g., 16 of N-(5-nitrile-2-pyridyl)-(S)-prolinol).

Similar synthesis was made regarding the optically inactive mesotartaric acid, and the SHG was evaluated. A yellow crystal was obtained, but no SHG could be obserbed.

As a comparative example, the acceptance of protons by amino groups contained in the conjugated π electron system will now be described. It was intended to produce salts of tartaric acid, malic acid and lactic acid with 2-methyl-4-nitroaniline (abbreviated as MNA) having a excellent non-linear optical characteristic as a molecular crystal organic compound. MNA and each of the above acids were dissolved by equal mols in water at 60° C., and the solution was then left at 5° to 20° C. However, no salt could be obtained.

This was thought to be attributable to withdrawing of electrons of an amino group of MNA by the nitro group resulting in diminished electron density at the amino group which made proton acceptance difficult.

It was also intended to produce a salt of more strongly acidic nitric acid and MNA. Excess nitric acid and MNA were added to water at room temperature. The solution was then left at 5° to 10° C. As a result, a substantially colorless, satisfactorily transparent and hard plate-like crystal was obtained. The SHG intensity of this crystal was measured after pulverizing the crystal in an agate motar. The SHG efficiency was at most 1/100 of that of urea and was difficult to measure. The salt was unstable with respect to water. By adding water to the powdery sample, the salt was decomposed to restore the initial MNA powder.

EXAMPLE 2

2.08 g of 1-(4-nitrophenyl)piperazine was dissolved in a solvent containing a mixture of 125 ml of tetrahydrofuran and 125 ml of toluene at room temperaturte. The resulting solution was mixed with a solution obtained by dissolving 1.94 g of D-phenylsuccinic acid in a solvent comprising a mixture of 125 ml of tetrahydrofuran and 125 ml of toluene. As a result, a precipitate was obtained. The solution and the precipitate were stirred for two hours. Then, the precipitate was recovered and twice recrystallized with water. A crystal sample having a size of 2 mm×0.2 mm×1.0 mm (Sample 2) was obtained.

The wavelength at the absorption edge of the sample was measured by a permeation process using a spectrophotometer and found to be about 514 nm.

Figure 5:
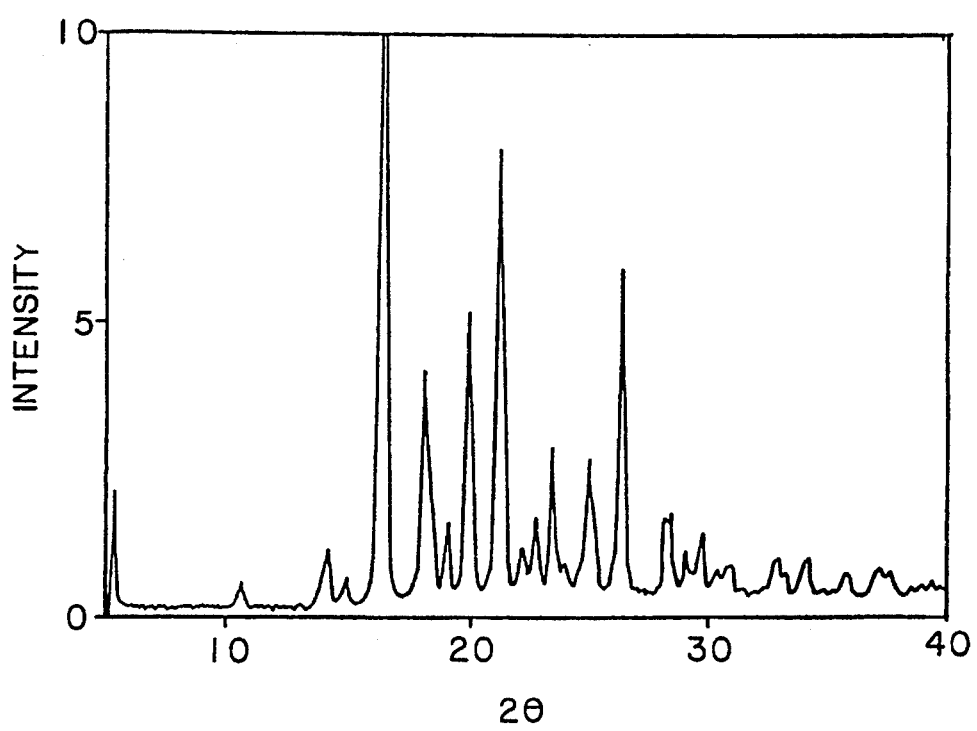
FIG. 5 is a chart showing X-ray diffraction pattern of a powder specimen of a non-linear optical material, i.e., 1-(4-nitrophenyl)piperazine in the form of a salt of D-phenylsuccinic acid. The material is described in Example 2.
Figure 6:
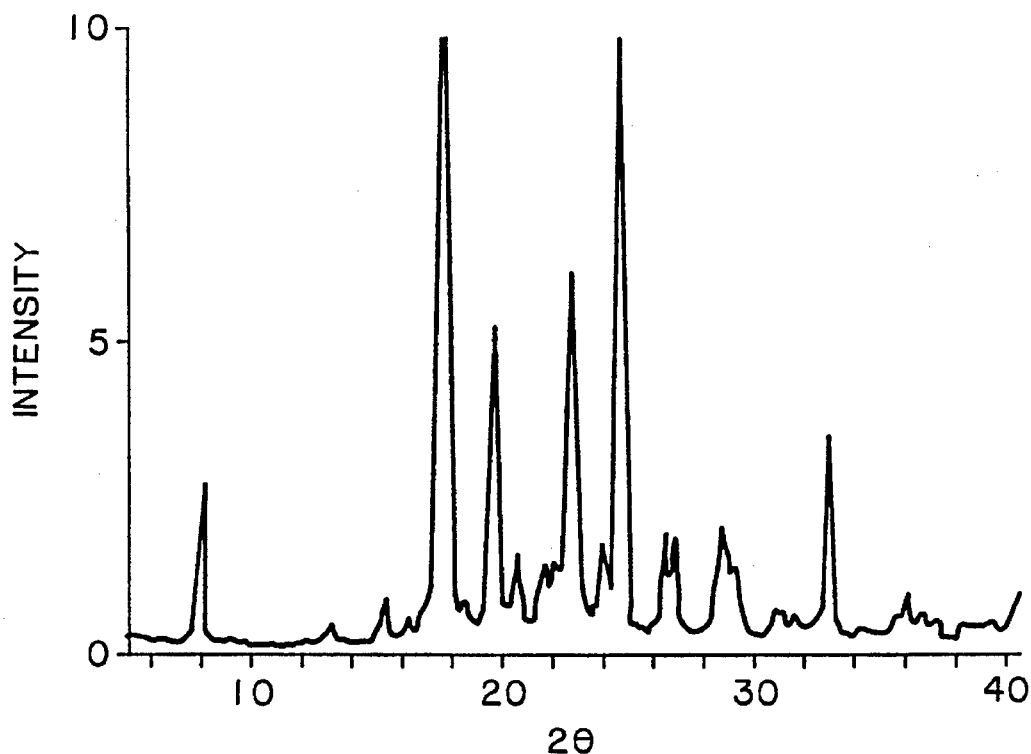
FIG. 6 is a chart showing X-ray diffraction pattern of a powder specimen of D-phenylsuccinic acid.

FIG. 5 shows an X-ray diffraction pattern obtained using $CuK_\alpha$ radiation of a sample obtained by pulverizing the obtained crystal. This X-ray diffraction pattern is different from those of the powder specimen of 1-(4-nitrophenyl)piperazine (shown in FIG. 3) and D-phenylsuccinic acid (shown in FIG. 6). This means that the obtained crystal is not a simple mixture of 1-(4-nitrophenyl)piperazine and D-phenylsuccinic acid.

It was recognized that the NMR spectrum of a DMSO-$d^6$ solution of the sample had signals due to two kind of the methylene groups of the 1-(4-nitrophenyl)piperazine part (having proton number of 4, respectively) at 2.974 , and 3.476 ppm, respectively signals due to two kind of hydrogen attached to the benzene ring of the 1-(4-nitrophenyl)piperazine part (having proton number of 2, respectively) at 7.031 and 8.065 ppm, respectively signals due to two kind of the methylene group in the D-phenylsuccinic acid part (having proton number of 1, respectively) at 2.40 and 2.838 ppm, respectively a signal due to the hydrogen bonded at the asymmetric carbon atom of the D-phenylsuccinic acid part having a proton number of 1 at 3.791 ppm and a signal due to the hydrogens attached to the benzene ring in the D-phenylsuccinic acid part (having a proton number of 5) at 7.265 ppm. The ratio of the peak intensity of these signals was 4:4:2:2:1:1:1:5. Thus, it was found that the obtained crystal smaple contained 1-(4-nitrophenyl)piperazine and D-phenylsuccinic acid in a molar ratio of 1:1.

A infrared spectrum of the sample, obtained by a permeation process (KBr tablet process), did not show absorption due to the imino group that would generally be expected to appear in the neighborhood of 3,300 cm$^{-1}$ with 1-(4-nitrophenyl)piperazine. In addition, regarding the absorption due to the carboxyl group, appearing in the neighborhood of 1,700 cm$^{-1}$, compared to the case of D-phenylsuccinic acid, the relative absorbance (i.e., the absorbance in D-phenylsuccinic acid or D-phenylsuccinic acid part relative to that of other absorption) was substantially reduced to one half. Thus, the obtained sample comprises organic cations produced as a result of the acceptance of protons by mono-substituted amino groups of 1-(4-nitrophenyl)piperazine and organic anions produced as a result of the loss of protons by carboxyl groups of D-phenylsuccinic acid.

From the above, it has been demonstrated that the obtained crystal sample is a salt containing organic cations which are produced as a result of the acceptance of protons by mono-substituted amino groups of 1-(4-nitrophenyl)piperazine, and organic anions, which are produced as a result of the loss of protons by carboxyl groups of D-phenylsuccinic acid, in a molar ratio of 1:1.

The SHG intensity of the sample was measured in the same way as in Example 1. It was found that the SHG efficiency of the sample was 13.2 times the value obtainable with urea, thus demonstrating excellent non-linear optical characteristics. Likewise, the SHG intensity of powder specimen of 1-(4-nitrophenyl)piperazine and powder specimen of D-phenylsuccinic acid were measured and found to be below the limit of measurement. From the above results, it has been demonstrated that the pNA structure parts, which are aligned centrosymmetrically in the 1-(4-nitrophenyl)piperazine, are aligned noncentrosymmetrically in the crystal of the salt of 1-(4-nitrophenyl)piperazine with D-phenylsuccinic acid. The SHG intensity of the powder specimen of D-phenylsuccinic acid was further measured and found to be below the limit of measurement.

EXAMPLE 3

1.82 g of 2-(2-aminoethylamino)-5-nitropyridine was dissolved in 180 ml of ethanol. 5 ml of an ethanol solution containing 1.32 g of L-malic acid was then added and a precipitate was produced. After stirring the solution for two hours, the precipitate was recovered and then dried to obtain a powder crystal sample.

It was confirmed that the sample was not a mere mixture of the raw materials by the same X-ray analysis as in Example 1.

The SHG intensity of the sample was measured in the manner as in Example 1. It was found that the SHG efficiency of the sample was about the same as the value obtainable with urea, thus demonstrating excellent non-linear optical characteristics. The SHG intensity of powder of 2-(2-aminoethylamino)- 5-nitropyridine was also measured and found to be below the limit of measurement. The pNA structure parts, which are aligned centrosymmetrically in the 2-(2-aminoethylamino)- 5-nitropyridine crystal, are aligned noncentrosymmetrically in this powder crystal sample. The SHG intensity of the powder specimen of L-malic acid was also measured and found to be below the limit of measurement.

EXAMPLE 4

1.82 g of 2-(2-aminoethylamino)-5-nitropyridine was dissolved in 200 ml of 1,4-dioxane. 15 ml of a 1,4-dioxane solution containing 1.52 g of L-mandelic acid was then added. As a result, a precipitate was produced. After stirring the mixture for two hours, the precipitate was recovered and then dried to obtain a powder sample.

The SHG intensity of the sample was measured in the same manner as in Example 1. It was found that the SHG efficiency of the sample was about the same as the value obtainable with urea, thus demonstrating excellent non-linear optical characteristics. The pNA strucure parts, which are aligned centrosymmetrically in the 2-(2-aminomethylamino)-5-nitropyridine crystal, are aligned noncentrosymmetrically in this powder sample. The SHG intensity of a L-mandelic acid crystal sample was also measured and found to be below the limit of measurement.

EXAMPLE 5

1.82 g of 2-(2-aminoethylamino)-5-nitopyridine was dissolved in 100 ml of tetrahydrofuran. 100 ml of a tetrafuran solution containing 1.94 g D-phenylsuccinic acid was then added. As a result, a precipitate was obtained. After stirring the mixture for two hours, this precipitate was recovered and then dried to obtain a powder sample.

The SHG intensity of the sample was measured in the same manner as in Example 1. It was found that the SHG efficiency of the sample was the same as the value obtainable with urea, thus demonstrating excellent non-linear optical characteristics. The pNA structure parts, which are aligned centrosymmetrically in the 2-(2-aminoethylamino)-5-nitropyridine crystal, are aligned noncentrosymmetrically in this powder sample.

EXAMPLE 6

1.82 g of 2-(2-aminoethylamino)-5-nitropyridine was dissolved in 150 ml of 1,4-dioxane. 10 ml of 1,4-dioxane solution containing 1.32 g of L-leucinic acid was then added. As a result, a precipitate was produced. After stirring the mixture for two hours, the precipitate was recovered and then dried to obtain a powder sample.

The SHG intensity of the sample was measured in the same manner as in Example 1. It was found that the SHG efficiency of the sample was about the same as the value obtainable with urea, thus demonstrating excellent non-linear optical characteristics. The pNA structure parts, which are aligned centrosymmetrically in the 2-(2-aminoethylamino)-5-nitropyridine, are aligned noncentrosymmetrically in this powder sample.

The SHG intensity of L-leucinic acid powder was also measured and found to be below the limit of measurement.

EXAMPLE 7

A solution obtained by dissolving 2.36 g of 2-(diethylamino)ethyl 4-aminobenzoate in a mixture of 20 ml of tetrahydrofuran and 20 ml of toluene at room temperature, was mixed with a solution obtained by dissolving 1.94 g of D-phenylsuccinic acid in a mixture of 20 ml of tetrahydrofuran and 20 ml of toluene at room temperature. As a result, a precipitate was produced. After stirring the mixture for two hours, the precipitate was recovered and then dried to obtain a powder sample.

The SHG intensity of the sample was measured in the same manner as in Example 1. It was found that the SHG efficiency of the sample was about the same as the value obtainable with urea, thus demonstrating excellent non-linear optical characteristics. The SHG intensity of the powder of 2-(diethylamino)ethyl 4-aminobenzoate was also measured and found to be below the limit of measurement. Although the crystal structure of 2-(diethylamino)ethyl 4-aminobenzoate crystal is a centrosymmetric, that of this powder sample is noncentrosymmetric.

EXAMPLE 8

A saturated solution of about 20 cc containing Sample 1-A prepared as in Example 1, and a water/tetrahydrofuran mixture (having a volume ratio of 3:7), was prepared and maintained at 23° C. to slowly evaporate the solvent. In this way, a highly transparent crystal having a size of 0.2 mm×1 mm×3 mm (Sample 1-C) was obtained in about three days.

A saturated solution of about 100 cc containing Sample 1-A, prepared in Example 1, and a water/tetrahydrofuran mixture (having a volume ratio of 3:7) was prepared. Then Sample 1-C was mounted in the resulting solution. The solution was left at 23° C. to slowly evaporate of the solvent. In this way, a highly transparent crystal having a size of 5 mm×30 mm×90 mm was obtained in about 50 days.

The wavelength at the absorption edge of the crystal was measured by the permeation process using a spectrophotometer and found to be about 505 nm. As a result of powder X-ray diffraction, the crystal was found to have a same crystal structure as that of either Sample 1-A or Sample 1-B.

The crystal was also irradiated with a Q switched Nd:YAG laser beam as a fundamental wave. A phase-matched green light could be observed.

Using a fundamental wave peak power of 300 MW, an output light power of 150 MW was obtained. The conversion efficiency was 50%.

EXAMPLE 9

Figure 7:
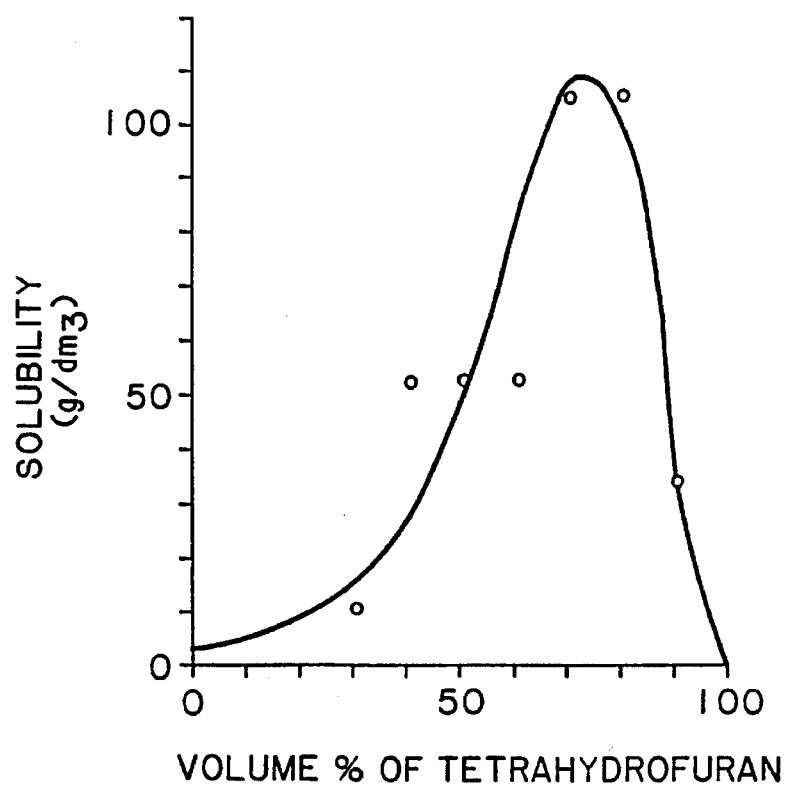
FIG. 7 is a graph showing the solubility of a non-linear optical material, i.e., 1-(4-nitrophenyl) piperazine in the form of a salt of D-phenylsuccinic acid, with respect to water/tetrahydrofuran mixtures. The solubility is described in Example 8.

The graph of FIG. 7 shows the solubility of Sample 2, prepared as in Example 2, with respect to a water/tetrahydrofuran mixture. Sample 2 was dissolved in the water/tetrahydrofuran mixture (having a volume ratio of 3:7) in which Sample 2 is soluble very well and a saturated solution of about 100 cc was obtained. The saturated solution was left at 23° C. to slowly evaporate the solvent. In this way, a highly transparent crystal having a size of 5 mm×30 mm×30 mm was obtained in about five days.

EXAMPLE 10

A saturated solution of about 100 cc of Sample 1-B, prepared as in Example 1, in water/acetonitrile mixture (having a volume ratio of 1:1) was left at 23° C. to slowly evaporate the solvent. In this way, a highly transparent crystal having a size of 20 mm×10 mm×1 mm was obtained in about 15 days.

EXAMPLE 11

Figure 8:
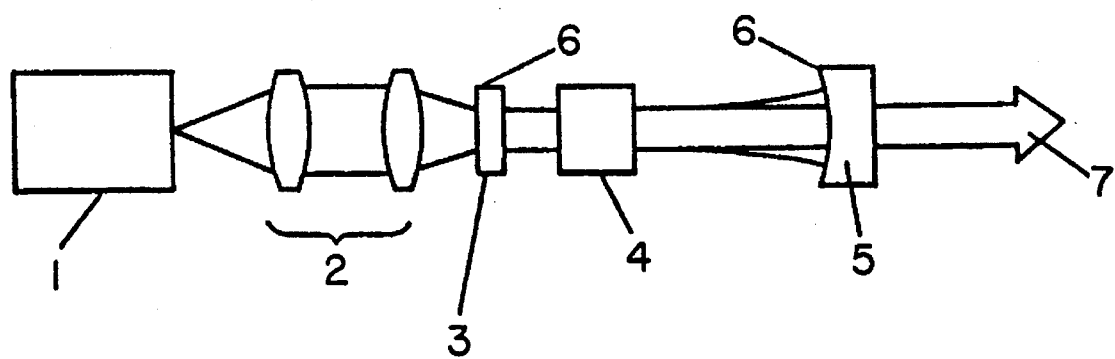
FIG. 8 is a schematic view showing a cavity type optical wavelength converter. The converter is described in Example 10.

An optical wavelength converter according to the invention will now be described with reference to FIG. 8. Referring to FIG. 8, designated at 1 is a semiconductor laser, at 2 is a lens system, at 3 is a Nd:YAG crystal, at 4 is an optical wavelength conversion crystal, at 5 is a mirror, at 6 is a optical resonator, and at 7 is the second harmonic.

The optical cavity was constructed between an end surface of the Nd:YAG crystal 3 and the surface of the mirror 5 in the optical wavelength converter of this example. The optical wavelength conversion crystal 4 comprised a cut crystal containing the salt of 1-(4-nitrophenyl)piperazine with L-tartaric acid was interposed between the above two surfaces. A quartz glass having antireflection coating on the surface was included to permit light at wavelengths of 1.06 and 0.53 μm to be readily transmitted. The quartz glass was attached to the cut crystal using matching oil or resin.

A Nd:YAG laser from the Nd:YAG crystal 3 wavelength of 1.06 μm pumped by the semiconductor laser 1 (with wavelength of 808 nm and output power of 1 W) is fundamental wave.

This fundamental wave has a very strong electric field strength in the optical cavity. Thus, it is possible to expect a high conversion efficiency.

Using a single crystal (having a thickness of 2 to 10 mm) of a salt represented by the aforesaid formula (4), which was provided with the above antireflection coating on the surface, with a semiconductor laser power of 1 W, green light of 1 mW was obtained as the second harmonic output.

It is thought that a further improvement of the conversion efficiency is obtainable by improving the transparency of the crystal or selecting an optimum direction of a fundamental wave incidence on the crystal in which the phase matching is possible and effective non-linear coefficient is great while the work-off angle between the propagation directions of the fundamental wave and the second harmonic is small.

Any material capable of direct antireflection coating of the organic crystal may be used.

While the above examples were concerned with salts containing two different kinds of ions, the invention is equally applicable to a salt containing three or more different kinds of ions. It is also applicable to a salt crystal containing water of crystallization.

As has been described in the foregoing, according to the invention, a second-order non-linear optical material, which is readily capable of crystal growth and ensures high hardness of the crystal and has excellent processability and non-linear optical characteristics as the crystal, can be readily provided.

In a preferred mode of the invention in which the organic compound is 1-(4-nitrophenyl)piperazine or 2-(2-aminoethylamino)- 5-nitropyridine, the non-linear optical material does not absorb the second harmonic of the Nd:YAG laser beam and can provide more satisfactory wavelength conversion characteristics.

Further, the method manufacturing of a non-linear optical material according to the invention permits a large crystal non-linear optical material to be obtained because the salts noted above are capable of being readily dissolved in a mixed solvent comprising water and an organic solvent.

Furthermore, according to the invention, an optical wavelength converter having excellent optical wavelength conversion characteristics, can be obtained by using any of the non-linear optical materials noted above as the optical wavelength conversion crystal.

We claim:

1. A method of manufacturing a non-linear optical material, comprising producing a single crystal of a salt formed from an organic compound and an optically active organic acid from a solution of a solvent containing a mixture of water and an organic solvent prepared by temperature reduction or solvent evaporation, wherein said optically active organic acid is at least one selected from the group consisting of phenylsuccinic acid, malic acid, mandelic acid, leucinic acid, lactic acid, tartaric acid, abietic acid, quinic acid, camphoric acid, camphor-10-sulfonic acid, methoxyphenylacetic acid, 2-methoxy-2-trifluoromethylphenylacetic acid and phenylpropionic acid, wherein said organic compound has a conjugated π electron system containing both electron donor and acceptor groups and has at least one substitute group selected from the group consisting of $-NH_2$, $-NH-$ and $-N-$ which is located outside of said conjugated π electron system wherein:

said conjugated π electron system is derived from a material selected from the group consisting of benzene derivatives, pyridine derivatives, pyrimidine derivatives, pyrazine derivatives, triazine derivatives, pyrane derivatives, pyrrole derivatives, pyrroline derivatives, pyrazole derivatives, imidazole derivatives, furan derivatives, thiophene derivative, thiazole derivatives, naphthalene derivatives, quinoline derivatives, indole derivatives, benzimidazole derivatives, indazole derivatives, benzofuran derivatives, benzothiazole derivatives, vinyl derivatives, and allyl derivatives;

said electron donor groups are selected from the group consisting of amino groups, monosubstituted amino groups, disubstituted amino groups, hydroxyl amino groups, disubstituted amino groups, hydroxyl groups, and alkoxy groups;

said electron acceptor groups are selected from the group consisting of nitro groups, cyano groups, and carbonyl groups.

2. The method of manufacturing a non-linear optical material according to claim 1, wherein said organic compound is 1-(4-nitrophenyl)piperazine, said organic acid is at least one organic acid selected from the group consisting of tartaric acid and phenylsuccinic acid, and said organic solvent is tetrahydrofuran.

3. The method of manufacturing a non-linear optical material according to claim 1, wherein said organic compound is 1-(4-nitrophenyl)piperazine, said organic acid is tartaric acid, and said organic solvent is acetonitrile.

4. The method of manufacturing a non-linear optical material according to claim 1, wherein said organic compound is a 2-(diethylamino) ethyl 4-aminobenzoate and said organic acid is a phenylsuccinic acid.

* * * * *

UNITED STATES PATENT AND TRADEMARK OFFICE
CERTIFICATE OF CORRECTION

PATENT NO.   : 5,460,754
DATED        : October 24, 1995
INVENTOR(S)  : Ozaki et al.

It is certified that error appears in the above-identified patent and that said Letters Patent is hereby corrected as shown below:

In column 12, line 65, delete "—N—" and insert
-- —N̶— --.

In column 13, lines 13 and 14, delete "hydroxyl amino groups, disubstituted amino groups".

Signed and Sealed this

Fourteenth Day of May, 1996

Attest:

BRUCE LEHMAN

Attesting Officer    Commissioner of Patents and Trademarks